United States Patent [19]
Takahashi et al.

[11] Patent Number: 4,668,994
[45] Date of Patent: May 26, 1987

[54] FACSIMILE APPARATUS

[75] Inventors: Masatomo Takahashi, Kawasaki; Toru Maeda, Yokohama, both of Japan

[73] Assignee: Canon Kabushiki Kaisha, Tokyo, Japan

[21] Appl. No.: 608,717

[22] Filed: May 10, 1984

[30] Foreign Application Priority Data

May 20, 1983 [JP] Japan .................................. 58-88663

[51] Int. Cl.⁴ .......................... H04N 1/32; H04N 1/40
[52] U.S. Cl. .................................. 358/256; 358/257; 358/280; 340/756; 340/802
[58] Field of Search ............... 358/256, 257, 258, 280, 358/286; 340/756, 802

[56] References Cited

U.S. PATENT DOCUMENTS

| | | | |
|---|---|---|---|
| 3,800,080 | 3/1974 | Fuwa | 358/280 |
| 3,925,775 | 12/1975 | Gay | 340/756 |
| 3,962,534 | 6/1976 | Ogawa | 358/256 |
| 4,158,861 | 6/1979 | Lizuka | 358/257 |
| 4,203,136 | 5/1980 | Wellendorf et al. | 358/256 |
| 4,274,114 | 6/1981 | Kozima | 358/257 |
| 4,331,983 | 5/1982 | Burton et al. | 358/257 |
| 4,419,697 | 12/1983 | Wada | 358/258 |
| 4,502,080 | 2/1985 | Tsuda | 358/256 |

Primary Examiner—Howard W. Britton
Assistant Examiner—John K. Peng
Attorney, Agent, or Firm—Fitzpatrick, Cella, Harper & Scinto

[57] ABSTRACT

A single indicator in a facsimile apparatus time-sharingly indicates a plurality of kinds of information associated with the distant side of communication or indicates that the communication is being performed, thereby increasing an amount of information to be indicated and simplifying the indicator, then leading to a miniaturization of the apparatus.

7 Claims, 4 Drawing Figures 4,668,994

FACSIMILE APPARATUS

BACKGROUND OF THE INVENTION

1. Field of the Invention

The present invention relates to a facsimile apparatus comprising means for indicating communication information of an apparatus on the distant side.

2. Description of the Prior Art

In conventional apparatuses of this kind equipped with an indicator is used merely to display the fixed content, as an indication during that communication as being performed, regardless of the identity or nature of the apparatus at the distant side of communication. For example, it merely indicates "G3" as the communication mode, and the like.

Therefore, insufficient information is provided by the indicator, in particular, the inquiry information and the like between the rear side and the distant side of communication by NSF (Non-Standard Facilities), etc. in accordance with a recommendation T.30 by CCITT (International Telegraph and Telephone Consultative Committee) has been omitted, and such inquiry information was not provided to the user of the apparatus.

SUMMARY OF THE INVENTION

It is a first object of the present invention to indicate a plurality of information for recognizing the distant side of a communication, and an indication representing that the communication is being performed with a simple implementation.

It is a second object of the invention to indicate a plurality of kinds of information by a single indicator.

A third object of the invention is to realize a miniaturization of such an apparatus.

DETAILED DESCRIPTION OF THE PREFERRED EMBODIMENT

Figure 1:
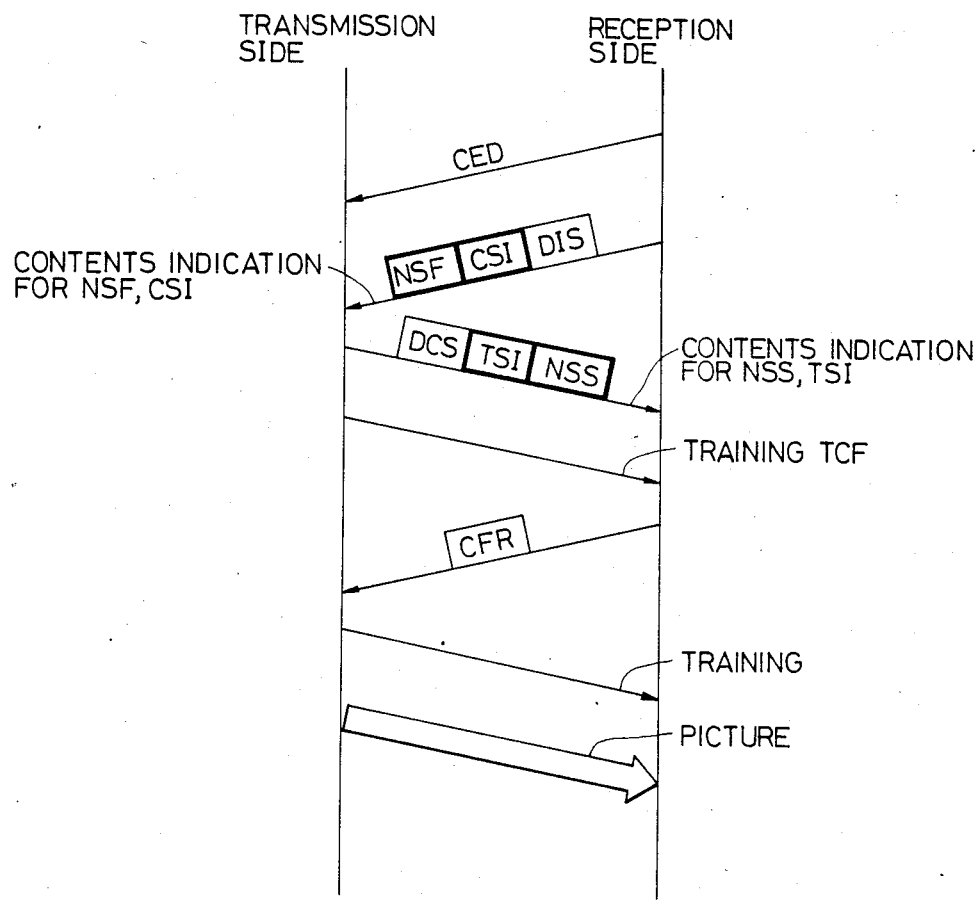
FIG. 1 is an explanatory diagram showing the communication procedure according to a selected CCITT protocol recommendation.

FIG. 1 shows the communication procedure based on a recommendation T.30 by CCITT.

Figure 2:
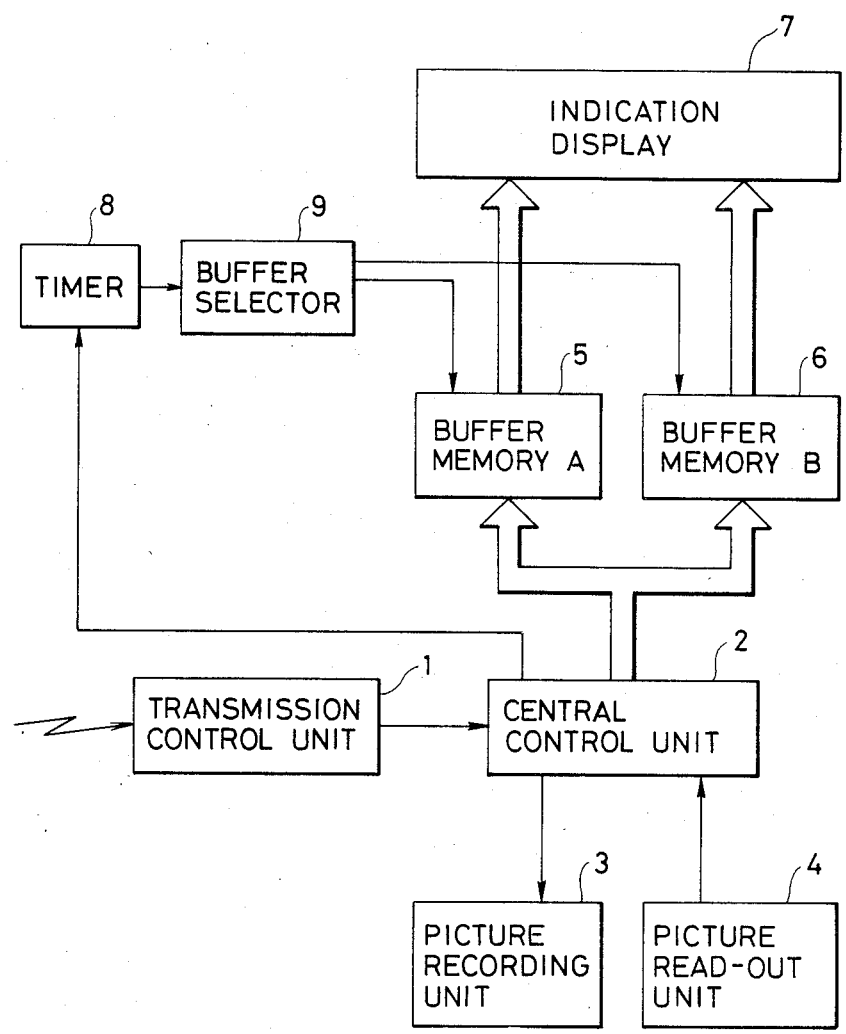
FIG. 2 is a block diagram showing an embodiment of the present invention.

FIG. 2 shows an embodiment of the present invention, in which a transmission control unit 1 performs the transmission procedure and communication control. A central control unit 2 controls a system in accordance with a flowchart shown in FIG. 2 and a picture recording unit 3 prints a picture received. Picture read-out unit 4 reads out a picture to be transmitted. A reference numeral 5 denotes a buffer memory A for storing data to be indicated and reference numeral 6 represents a buffer memory B having a similar function as the buffer memory A. An indication display 7 indicates the data of the buffer memory A or B. Timer 8 specifies a constant time. A buffer selector 9 selects the buffer memory A or B.

Figure 3:
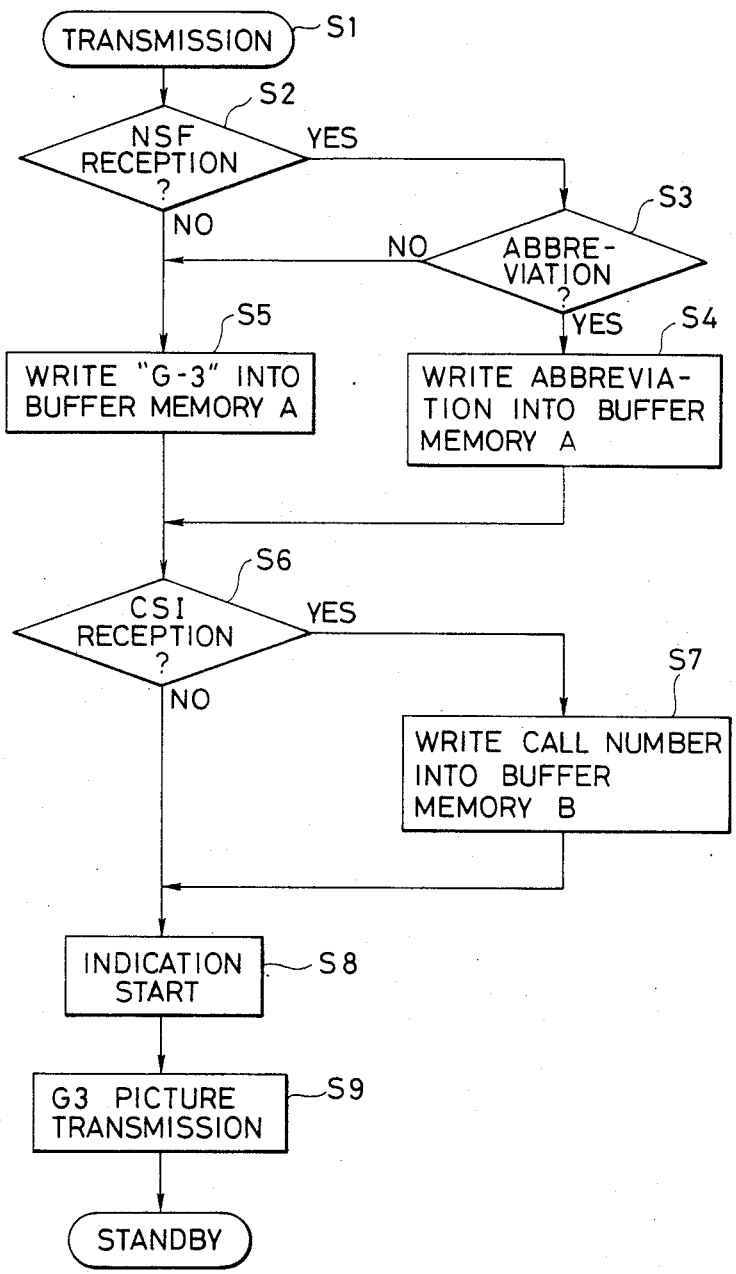
FIG. 3 shows a flowchart on the transmission side in the constitution of FIG. 2.
Figure 4:
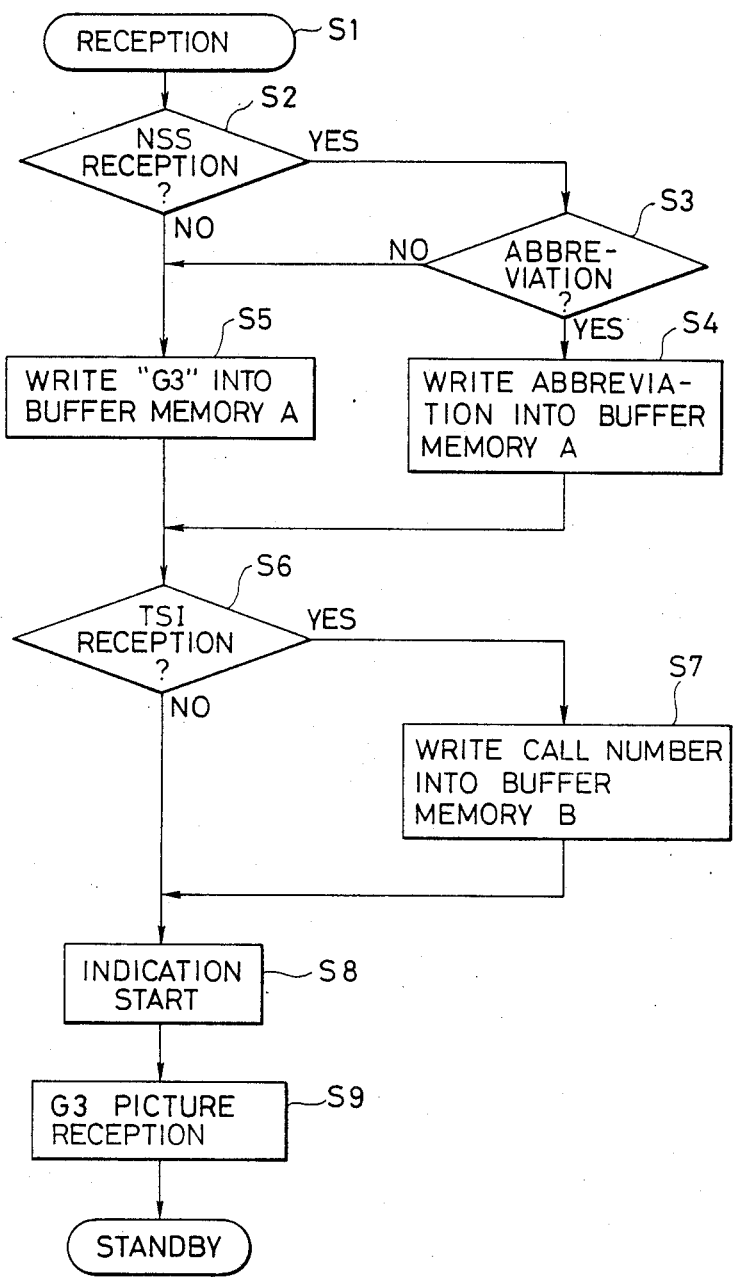
FIG. 4 shows a flowchart on the reception side in the constitution of FIG. 2.

The invention will now be described in detail hereinbelow with reference to FIG. 1 (explanatory diagram for the communication procedure), FIG. 2 (block diagram), and FIGS. 3 and 4 (flowcharts). When communicating with the apparatus on the distant side of communication on the basis of the procedure of protocol recommendation T.30 by CCITT, mutual call numbers are transmitted on the basis of CSI (Called Subscriber Identification), TSI (Transmitting Subscriber Identification), etc. shown in FIG. 1. In addition, the format contents are predetermined between the mutual communications based on NSF (Non-Standard Facilities), NSS (Non-Standard Facilities Set-up), etc., and a rule is predetermined so that the abbreviation of the apparatus on this side is transmitted to the distant side. In FIG. 1, abbreviations are defined as follows: CED (Called Station Identification); DIS (Digital Identification Signal); DCS (Digital Command Signal); TCF (Training Check); and CFR (Confirmation To Receive).

In the present invention, a constitution shown in FIG. 2 can be implemented for both the transmission and reception sides. The description will be made first from the transmission side with respect to FIG. 3. The signals from the receiver on the distant side of communication are received by the transmission control unit 1 shown in FIG. 2. In NSF and CSI as the preparation procedure, in accordance with the procedure of steps S2 to S7 in FIG. 3, the abbreviation of the distant apparatus of the content of NSF is written into the buffer memory A (step S4) by the central control unit 2. Then, the call number of the distant apparatus of the content of CSI is written into the buffer memory B (step S7). The timer 8 serves to trigger the buffer selector 9 at every constant time in response to a start signal from the central control unit 2. The buffer selector 9 alternately selects the buffer memories A and B whenever it is triggered, thereby allowing the indication display 7 to indicate the content of the buffer memory thus selected in step S8. Then, a G3 picture is transmitted in step S9.

On the other hand, the description will now be made from the reception side with respect to FIG. 4. The signals from the transmitter on the distant side of communication are received by the transmission control unit 1 shown in FIG. 2. In NSS and TSI as the preparation procedure, in accordance with the procedure of steps S2 to S7 in FIG. 4, the abbreviation of the distant apparatus of the content of NSS is written into the buffer memory A (step S4) by the central control unit 2. Then, the call number of the distant apparatus of the content of the TSI is written into the buffer memory B (step S7). The timer 8 serves to trigger the buffer selector 9 at every constant time in response to a start signal from the central control unit 2. The buffer selector 9 alternately selects the buffer memories A and B whenever it is triggered, thereby allowing the indication display 7 to indicate the content of the buffer memory thus selected in step S8. Then, a G3 picture is received in step S9. Thereafter, when the picture data is received by the transmission control section 1, it is recorded as a picture by the picture recording unit 3 through the central control unit 2.

While the picture is being recorded, the distant call number and abbreviation are and preferably, repeatedly alternately indicated in the indicator.

Upon completion of the communication, the central control unit 2 provides a stop signal to the timer 8, thereby causing the display 7 to stop the alternate indication.

In addition, on the transmission side, if only either one of NSF and CSI is sent from the distant side of communication, its content will be written in the buffer memory A or B and the central control unit 2 will operate in a manner such that the timer 8 is not activated but the continuous indication is performed. On the receiver side, similar processes are executed with respect to NSS and TSI.

As a modification of the foregoing embodiment of the invention, it is also possible to increase the number of buffer memories and thereby to alternately indicate additional information. In addition, several timers or a programmable timer may be used, thereby enabling the interval between the alternately indication times to be arbitrarily set.

With such a constitution, if priorities or degrees of significance are added to the information to be indicated, by selecting the number of times of indication, sequence of indication, indication time period, etc. according to the content, it is possible to make the user of the apparatus aware of the significance of the information.

Although two buffers have been provided to perform two kinds of indication in the invention, this may be substituted by another method whereby two kinds of data are sent to the indication unit at every predetermined time by the central control unit. That is, the double buffer is not an essential component which is indispensable to implement the present invention.

As described above, in the facsimile apparatus of the invention, the information to be communicated between the rear side and the distant side can be sufficiently provided to the user of the apparatus by a simple constitution which hardly changes the components and parts in the conventional apparatus. Furthermore, it is also possible to inform the user of the apparatus that the communication is being performed.

What we claim is:

1. A facsimile apparatus comprising:
control means for controlling a plurality of kinds of signals input from an apparatus on the distant side and alternately outputting one and the other of said plurality of kinds of signals; and
one indicating means for indicating the signal output from said control means;
wherein the contents of said plurality of kinds of signals input from said distant apparatus include NSF and CSI to be determined in accordance with Recommendation T.30 of CCITT, and the name, included in said NSF, of the apparatus on the distant side and the identifying number, included in said CSI, of the apparatus on the distant side are sequentialy switched at every predetermined time and are indicated by said one indicating means.

2. A facsimile apparatus comprising:
control means for controlling a plurality of kinds of signals input from an apparatus on the distant side and alternately outputting one and the other of said plurality of kinds of signals; and
one indicating means for indicating the signal output from said control means;
wherein the contents of said signals input from the apparatus on the distant side include NSS and TSI to be determined in accordance with Recommendation T.30 of CCITT, and the name, included in said NSS, of the apparatus on the distant side and the identifying number, included in said TSI, of the apparatus on the distant side are sequentially switched at every predetermined time and are indicated by said one indicating means.

3. A facsimile apparatus comprising:
control means for controlling a plurality of kinds of signals input from an apparatus on the distant side and outputting them;
first memory means for storing the name of the apparatus on the distant side;
second memory means for storing the identifying number of the apparatus on the distant side;
selecting means for alternately outputting the signals selected from said first and second memory means;
timer means for outputting a switch signal at every predetermined time for allowing the selecting means to alternately select, said timer means being controlled by said control means; and
one indicating means for indicating the signals output from said first and second memory means.

4. A facsimile apparatus comprising:
control means for controlling a plurality of kinds of signals input from an apparatus on the distant side and outputting them;
first and second memory means for storing the signals output from said control means;
selecting means for alternatively outputting the signals selected from said first and second memory means;
timer means for outputting a switch signal at every predetermined time for allowing the selecting means to alternately select, said timer means being controlled by said control means; and
one indicating means for indicating the signals output from said first and second memory means;
wherein said first memory means stores the NSF signal to be determined in accordance with Recommendation T.30 of CCITT and said second memory means stores the CSI signal to be determined in accordance with Recommendation T.30 of CCITT, and wherein said one indicating means sequentially indicates either one of the indications based on the NSF signal or CSI signal.

5. A facsimile apparatus comprising:
control means for controlling a plurality of kinds of signals input from an apparatus on the distant side and outputting them;
first and second memory means for storing the signals output from said control means;
selecting means for alternately outputting the signals selected from said first and second memory means;
timer means for outputting a switch signal at every predetermined time for allowing the selecting means to alternately select, said timer means being controlled by said control means; and
one indicating means for indicating the signals output from said first and second memory means;
wherein said first memory means stores the NSS signal to be determined in accordance with Recommendation T.30 of CCITT and said second memory means stores the TSI signal to be determined in accordance with Recommendation T.30 of CCITT, and wherein said one indicating means sequentially indicates either one of the indications based on the NSS signal or TSI signal.

6. A facsimile apparatus comprising:
means for transmitting image signals and a plurality of control signals from a remote apparatus, wherein said plurality of control signals represents at least one attribute of the remote apparatus;
means for receiving the image signals and control signals transmitted by the remote apparatus;

means for recording the image signals received by said receiving means;

means for storing the control signals received by said receiving means; and means for displaying information corresponding to data sets contained in the control signals stored in said storing means, wherein the information corresponding to each data set is displayed during separate time slots;

wherein said display means repeatedly displays the information corresponding to each data set, and wherein said control signals include at least one of NSF and CSI data sets determined in accordance with protocol Recommendation T.30 of CCITT.

7. A facsimile apparatus comprising:

image signal generating means for reading an original to generate image signals and a plurality of control signals wherein said control signals include at least one of NSF and CSI data sets determined in accordance with protocol Recommendation T.30 of CCITT;

means for transmitting the generated image signals and control signals;

means for receiving the image signals and control signals;

means for storing the control signals received; and means for displaying information corresponding to the control signals, wherein said control signals include at least one of NSF and CSI data sets determined in accordance with protocol Recommendation T.30 of CCITT;

wherein said display means repeatedly displays the information corresponding to each data set, and wherein said control signals consist of one of NSF and CSI data sets determined in accordance with protocol Recommendation T.30 of CCITT.

* * * * *

UNITED STATES PATENT AND TRADEMARK OFFICE
CERTIFICATE OF CORRECTION

PATENT NO. : 4,668,994         Page 1 of 2
DATED      : May 26, 1987
INVENTOR(S): MASATOMO TAKAHASHI, ET AL.

It is certified that error appears in the above-identified patent and that said Letters Patent is hereby corrected as shown below:

AT [57] IN THE ABSTRACT

Line 6, "then" should read --thus--.

COLUMN 1

Line 10, "equipped" should be deleted.
    Line 11, "with" should be deleted.
    Line 19, "rear" should read --near--.
    Line 58, "A reference" should read --Reference--.

COLUMN 2

Line 62, "alternately indicated" should read --alternately and, preferably, repeatedly indicated--.

COLUMN 3

Line 12, "alternately" should be deleted.
    Line 30, "rear" should read --near--.

UNITED STATES PATENT AND TRADEMARK OFFICE
CERTIFICATE OF CORRECTION

PATENT NO. : 4,668,994

DATED : May 26, 1987

INVENTOR(S) : MASATOMO TAKAHASHI, ET AL.

It is certified that error appears in the above-identified patent and that said Letters Patent is hereby corrected as shown below:

COLUMN 3

Line 51, "sequentialy" should read --sequentially--.

Signed and Sealed this

Sixth Day of October, 1987

*Attest:*

DONALD J. QUIGG

*Attesting Officer*         *Commissioner of Patents and Trademarks*